United States Patent
Kitayama

(10) Patent No.: US 9,133,282 B2
(45) Date of Patent: Sep. 15, 2015

(54) METHOD FOR PRODUCING METHYL METHACRYLATE POLYMER

(75) Inventor: Fuminobu Kitayama, Takasago (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 13/978,267

(22) PCT Filed: Dec. 27, 2011

(86) PCT No.: PCT/JP2011/007287
§ 371 (c)(1),
(2), (4) Date: Sep. 17, 2013

(87) PCT Pub. No.: WO2012/093464
PCT Pub. Date: Jul. 12, 2012

(65) Prior Publication Data
US 2014/0005346 A1   Jan. 2, 2014

(30) Foreign Application Priority Data

Jan. 6, 2011 (JP) .................... 2011-001344

(51) Int. Cl.
*C08F 2/18* (2006.01)
*C08F 220/10* (2006.01)
*C08F 220/14* (2006.01)

(52) U.S. Cl.
CPC .............. *C08F 2/18* (2013.01); *C08F 220/10* (2013.01); *C08F 220/14* (2013.01)

(58) Field of Classification Search
CPC ............ C08F 2/18; C08F 20/10; C08F 20/14; C08F 220/10; C08F 220/14
USPC .............................................. 526/329.5, 209
See application file for complete search history.

(56) References Cited

U.S. PATENT DOCUMENTS 5,045,611 A * 9/1991 McNeil .................... 526/81

FOREIGN PATENT DOCUMENTS

| CN | 1871296 A | 11/2006 | |
|---|---|---|---|
| JP | 56-8404 A | 1/1981 | |
| JP | 62-209108 A | 9/1987 | |
| JP | 1-231001 A | 9/1989 | |
| JP | 05025217 A * | 2/1993 | ............ C08F 20/14 |
| JP | 2000-44609 A | 2/2000 | |
| JP | 2000-86804 A | 3/2000 | |
| JP | 3118877 B2 | 12/2000 | |
| JP | 2001-233986 A | 8/2001 | |

OTHER PUBLICATIONS

English Abstract of JP2001-233986.*
International Search Report for PCT/JP2011/007287 dated Feb. 7, 2012.
Chinese Office Action dated Nov. 13, 2014 issued in Application No. 201180064159.4 with English translation of the Search Report.

* cited by examiner

*Primary Examiner* — Vu A Nguyen
(74) *Attorney, Agent, or Firm* — Sughrue Mion, PLLC

(57) ABSTRACT

Provided herein is a (meth)acrylic resin that has less impurities and is less likely to deteriorate in transparency or turn yellow during molding processing, which is not obtainable by conventional suspension polymerization. The invention is a method for producing a methyl methacrylate polymer, comprising suspension polymerization of 30 to 100 wt % of methyl methacrylate and 70 to 0 wt % of a monomer copolymerizable therewith to produce a methyl methacrylate polymer, wherein the polymerization is initiated in the presence of 350 ppm or less of a suspension stabilizer relative to the monomer(s) and then a suspension stabilizer is added when a polymerization conversion ratio reaches 20 to 90%.

7 Claims, No Drawings

METHOD FOR PRODUCING METHYL METHACRYLATE POLYMER

CROSS REFERENCE TO RELATED APPLICATIONS

This application is a National Stage of International Application No. PCT/JP2011/007287 filed Dec. 27, 2011, claiming priority based on Japanese Patent Application No. 2011-001344 filed Jan. 6, 2011, the contents of all of which are incorporated herein by reference in their entirety.

TECHNICAL FIELD

The present invention relates to a method for producing a methyl methacrylate polymer that has less impurities and is less likely to be thermally degraded and discolored during processing.

BACKGROUND ART (Meth)acrylic resins have long been widely used in various fields as glass substitutes for their transparency, luster, surface hardness, weather resistance, and mechanical properties. For example, (meth)acrylic resins are used as capstocks covering the surfaces of materials for outdoor use, display panels of mobile phones and the like, and transparent members for display housings. Further, (meth)acrylic resins are used in optical devices such as lenses and prisms, and are recently used as substrates for information recording media such as video discs, audio discs, information discs, and optical cards and optical device materials such as optical fibers for their excellent moldability and low birefringence. The presence of impurities in an optical device such as an information recording medium substrate causes errors in, for example, reading of recorded information signals, which reduces the reliability of the optical device. The presence of impurities in a plastic optical fiber causes absorption or interruption of light so that optical transmission loss is increased, which reduces the performance of the plastic optical fiber. For this reason, (meth) acrylic resins are required to have less impurities when used as optical device materials.

(Meth)acrylic resins are produced by radical polymerization such as bulk polymerization, suspension polymerization, or emulsion polymerization. Particularly, bulk polymerization is most commonly used for the reason that (meth)acrylic resins having less impurities can be obtained. In the case of bulk polymerization, a (meth)acrylic resin product finally obtained is in the form of pellets. However, since many of materials to be added for the preparation of a composition, such as an impact resistance-improving agent and a processability-improving agent, are in the form of powder, there is a case where the pellets and the powder are separated from each other during compounding, transfer, and extrusion molding so that the components of the composition are non-uniformly mixed or dispersed.

On the other hand, in the case of suspension polymerization, particles having a diameter of several tens of microns to several thousand microns can be obtained by polymerization, and therefore a (meth)acrylic resin product obtained through the steps of washing and drying is a spherical powder, which is advantageous in that excellent mixing/dispersion performance is achieved when the (meth)acrylic resin product is compounded with another powder material. However, a suspension stabilizer and a suspension aid need to be added in large amounts as auxiliary materials to maintain stable dispersion of monomer-polymer droplets during polymerization. Therefore, it is pointed out that a small amount of impurities remain in the product even after washing, which becomes a cause of thermal degradation during molding processing. If the amount of the suspension stabilizer used is reduced, the dispersion stability of monomer-polymer droplets is reduced due to a reduction in the concentration of the suspension stabilizer, and therefore there is a case where the coalescence of monomer-polymer droplets occurs so that polymer particles having a wide particle size distribution are produced or agglomeration occurs in the whole of a polymerization system when conditions are unbalanced. For this reason, the problem of thermal degradation during molding processing (more specifically, deterioration in transparency and yellowing during molding processing) makes it more difficult to select the type of suspension stabilizer used and to adjust the concentration of the suspension stabilizer in terms of stable production and particle size control.

Under the circumstances, Patent Document 1 discloses, as a method for producing a high-purity (meth)acrylic resin by suspension polymerization, a method in which a mixed solution of water and an organic solvent having compatibility with water is added to a particulate polymer obtained by suspension polymerization to extract and separate a low-molecular-weight organic compound or a water-soluble inorganic compound from the polymer. In this method, an aftertreatment step is additionally performed after suspension polymerization, but addition of such a step itself not only complicates production but also has the possibility of introducing other impurities.

Patent Document 2 discloses a method in which suspension polymerization is performed in a polymerization tank under a specific stirring condition to produce thermoplastic polymer particles having less impurities. However, in this method, introduction of impurities into polymer particles is prevented only by controlling mechanical factors, and therefore it cannot be said that introduction of impurities is satisfactorily prevented, and in addition, the selectable range of the stirring condition is limited.

Patent Document 3 discloses a method for producing a (meth)acrylic resin for optical discs by suspension polymerization using a surfactant and sodium sulfate or sodium phosphate, and states that a superior optical disc substrate having less microbubbles can be obtained when the amount of cations remaining in the resin is smaller. In Patent Document 3, evaluation of impurities is made based on the amount of Na ions contained in the resin, but there is no specific description about the surfactant. For this reason, this method cannot be appreciated as a resin production method.

Patent Document 4 discloses a method for producing a high-purity (meth)acrylic resin having less impurities by suspension polymerization of a monomer mainly containing methyl methacrylate in an aqueous medium, in which an anionic water-soluble polymer is used as a suspension stabilizer at the start of polymerization and a nonionic water-soluble polymer is further added when the degree of polymerization is 20 to 85% to continue polymerization. However, in this method, polymerization is initiated in the presence of a relatively large amount of suspension stabilizer composed of an anionic water-soluble polymer, and therefore the anionic water-soluble polymer as a suspension stabilizer remains in a resulting particulate polymer, that is, only a low-purity particulate polymer is obtained. Further, this method still involves a problem such as deterioration in transparency or yellowing during molding processing.

As described above, it is difficult to obtain, by suspension polymerization, a (meth)acrylic resin that has less impurities and is less likely to deteriorate in transparency or turn yellow by thermal degradation during molding processing.

Patent Document 1: JP-A-62-209108
Patent Document 2: JP-A-56-8404
Patent Document 3: JP-A-1-231001
Patent Document 4: Japanese Patent No. 3118877

DISCLOSURE OF THE INVENTION

Problems to be Solved by the Invention

An object of the present invention is to provide a (meth) acrylic resin that has less impurities and is less likely to deteriorate in transparency or turn yellow during molding processing, which is not obtainable by conventional suspension polymerization. It is to be noted that the term "(meth) acrylic" as used in the present invention refers to acrylic and/or methacrylic.

Means for Solving the Problems

The present invention provides a method for producing a methyl methacrylate polymer, comprising suspension polymerization of 30 to 100 wt % of methyl methacrylate and 70 to 0 wt % of a monomer copolymerizable therewith to produce a methyl methacrylate polymer, wherein the polymerization is initiated in the presence of 350 ppm or less of an initial suspension stabilizer relative to the monomer(s) and then a later suspension stabilizer is added when a polymerization conversion ratio reaches 20 to 90%. In the present invention, the initial suspension stabilizer is preferably a nonionic water-soluble polymer and/or poorly water-soluble inorganic microparticles.

Further, in the present invention, the initial suspension stabilizer is preferably a nonionic water-soluble polymer. Further, in the present invention, the polymerization is preferably initiated without using the initial suspension stabilizer. Further, in the present invention, the nonionic water-soluble polymer is preferably a polyoxyethylene-polyoxypropylene block copolymer. Further, in the present invention, the polymerization is preferably initiated in the presence of a suspension aid. Further, in the present invention, the methyl methacrylate polymer preferably has a weight-average molecular weight of 200,000 or more. The present invention also provides a methyl methacrylate polymer whose nonionic water-soluble polymer content is 500 ppm or less.

Effects of the Invention

According to the method of the present invention, the suspension stabilizer used during suspension polymerization is less likely to remain in resulting methyl methacrylate polymer particles. Therefore, it is possible to obtain methyl methacrylate polymer particles, which are less likely to deteriorate in transparency or turn yellow due to thermal degradation during molding processing, without the need for special aftertreatment after the completion of polymerization. The obtained methyl methacrylate polymer particles are excellent as a material for use as a glass substitute or a material for use in optical materials, paint, inks, coating materials, and adhesives.

PREFERRED MODE FOR CARRYING OUT THE INVENTION

In the present invention, a methyl methacrylate polymer is obtained by suspension polymerization of 30 to 100 wt % of methyl methacrylate and 70 to 0 wt % of a monomer copolymerizable therewith.

Preferred examples of another vinyl monomer copolymerizable with methyl methacrylate include alkyl (meth)acrylates (except for methyl methacrylate) whose alkyl group has 1 to 10 carbon atoms. Specific examples of the another vinyl monomer copolymerizable with methyl methacrylate include: methacrylate esters such as ethyl methacrylate, butyl methacrylate, cyclohexyl methacrylate, benzyl methacrylate, glycidyl methacrylate, epoxycyclohexylmethyl methacrylate, 2-hydroxyethyl methacrylate, and 2-hydroxypropyl methacrylate; acrylate esters such as methyl acrylate, ethyl acrylate, butyl acrylate, 2-ethylhexyl acrylate, glycidyl acrylate, epoxycyclohexylmethyl acrylate, 2-hydroxyethyl acrylate, and 2-hydroxypropyl acrylate; carboxylic acids such as methacrylic acid and acrylic acid and esters thereof; vinyl cyanides such as acrylonitrile and methacrylonitrile; vinyl arenes such as styrene, α-methylstyrene, monochlorostyrene, and dichlorostyrene; maleic acid and fumaric acid and esters thereof; vinyl halides such as vinyl chloride, vinyl bromide, and chloroprene; vinyl acetate; alkenes such as ethylene, propylene, butylene, butadiene, and isobutylene; halogenated alkenes; and polyfunctional monomers such as allyl methacrylate, diallyl phthalate, triallyl cyanurate, monoethylene glycol dimethacrylate, tetraethylene glycol dimethacrylate, tetraethylene glycol dimethacrylate, and divinylbenzene. These vinyl monomers may be used singly or in combination of two or more of them.

The amount of methyl methacrylate contained in the methyl methacrylate polymer is 30 to 100 wt %, preferably 50 to 99.9 wt %, more preferably 50 to 98 wt %, and the amount of the monomer copolymerizable with methyl methacrylate contained in the methyl methacrylate polymer is 70 to 0 wt %, preferably 50 to 0.1 wt %, more preferably 50 to 2 wt %. If the amount of methyl methacrylate contained in the methyl methacrylate polymer is less than 30 wt %, optical characteristics, appearance, weather resistance, and heat resistance inherent in a (meth)acrylic resin tend to be impaired.

In the present invention, a methyl methacrylate polymer is obtained by suspension polymerization of a mixture of methyl methacrylate and a monomer copolymerizable therewith. The average particle size of polymer particles obtained by suspension polymerization is not particularly limited, but is preferably 50 to 4000 μm that is achieved by normal suspension polymerization. When the polymer particles are intended to be compounded with a material, such as an impact resistance-improving agent or a processability-improving agent, added during molding processing, the average particle size thereof is more preferably 50 to 1000 μm, even more preferably 50 to 800 μm to prevent separation during transfer and extrusion molding and non-uniform mixing/dispersion.

In the present invention, polymerization of a monomer composed of 30 to 100 wt % of methyl methacrylate and 70 to 0 wt % of a monomer copolymerizable therewith is initiated in the presence of 350 ppm or less of an initial suspension stabilizer relative to the monomer. Then, a later suspension stabilizer is added when the polymerization conversion ratio of the monomer reaches 20 to 90%, preferably 20 to 75%.

Examples of the initial suspension stabilizer and the later suspension stabilizer used include: a polymer-type suspension stabilizer composed of an anionic water-soluble polymer or a nonionic water-soluble polymer; and a poorly water-soluble inorganic microparticle-type suspension stabilizer such as tribasic calcium phosphate or barium sulfate.

Examples of the suspension stabilizer composed of an anionic water-soluble polymer include polyacrylic acid, sodium polyacrylate, potassium polyacrylate, polymethacrylic acid, sodium polymethacrylate, potassium polymethacrylate, and sodium methacrylate-alkyl methacrylate copolymers. Among them, sodium polyacrylate and sodium polymethacrylate are preferred.

Examples of the suspension stabilizer composed of a nonionic water-soluble polymer include water-soluble polymers such as polyvinyl alcohol, methyl cellulose, ethyl cellulose, hydroxymethyl cellulose, hydroxyethyl cellulose, polyvinyl pyrrolidone, hydroxypropyl methylcellulose, polyalkylene oxides such as polyethylene oxide, polyoxyethylene-polyoxypropylene block copolymers, polyoxyethylene lauryl ether, polyoxyethylene cetyl ether, polyoxyethylene nonylphenyl ether, polyethylene glycol fatty acid esters, and polyoxyethylene laurylamine. Among them, polyvinyl alcohol and polyoxyethylene-polyoxypropylene copolymers are preferred, and polyoxyethylene-polyoxypropylene block copolymers are more preferred.

Examples of the suspension stabilizer composed of poorly water-soluble inorganic microparticles include barium sulfate, tribasic calcium phosphate, and magnesium carbonate. Among them, tribasic calcium phosphate is preferred. The term "poorly water-soluble" as used herein means that solubility in water at 25° C. is 1 wt % or less.

The term "initial suspension stabilizer" as used in the present invention refers to a suspension stabilizer present at the start of polymerization. The initial suspension stabilizer is present in a system from the start of polymerization, and is therefore easily introduced into a resulting particulate polymer and remains as it is in the particulate polymer even after the particulate polymer is subjected to various aftertreatment steps. This results in problems such as a reduction in the purity of the particulate polymer and deterioration in transparency or yellowing during molding processing. For example, when a large amount of poorly water-soluble inorganic microparticles are used as a suspension stabilizer from the start of polymerization, the suspension stabilizer remains in a resulting particulate polymer so that deterioration in transparency inevitably occurs during molding processing or the like. Further, when a large amount of water-soluble polymer is used as a suspension stabilizer from the start of polymerization, the suspension stabilizer remains in a resulting particulate polymer so that yellowing occurs due to thermal degradation during molding processing. Therefore, it is important that the amount of the initial suspension stabilizer used be 350 ppm or less, preferably 200 ppm or less, more preferably 40 ppm or less relative to the monomer, and most preferably, no initial dispersant is used. It is to be noted that as will be described later, when a monomer or a monomer mixture is further added during the progress of a polymerization reaction to continue the polymerization reaction, the amount of the initial suspension stabilizer used means the amount of the initial suspension stabilizer relative to the total amount of the monomer(s) used in the entire process of the polymerization reaction.

It was previously believed that it was absolutely necessary to initiate polymerization in the presence of a relatively large amount of initial suspension stabilizer to ensure polymerization stability. However, the present inventors have newly found that, even when the amount of the initial suspension stabilizer is 350 ppm or less relative to the monomer or the initial suspension stabilizer is not used at all, the coalescence of polymer particles during polymerization can be suppressed by adding the later suspension stabilizer when the polymerization conversion ratio of the monomer reaches 20 to 90% so that an excellent bead-like particulate polymer is obtained. From the result, the present inventors have found that the total amount of the suspension stabilizer used can be reduced to reduce the amount of the suspension stabilizer to be introduced into a resulting particulate polymer, which makes it possible to produce a methyl methacrylate polymer that has less impurities and is less likely to deteriorate in transparency or turn yellow due to thermal degradation during molding processing. It is to be noted that when a monomer or a monomer mixture is further added during the progress of a polymerization reaction to continue the polymerization reaction, the polymerization conversion ratio refers to a value determined based on the total amount of the monomer(s) used in the entire process of the polymerization reaction.

The initial suspension stabilizer is selected from a polymer-type suspension stabilizer such as an anionic water-soluble polymer or a nonionic water-soluble polymer and an inorganic microparticle-type suspension stabilizer. These suspension stabilizers may be used singly or in combination of two or more of them. However, the use of an anionic water-soluble polymer is particularly likely to lead to yellowing during molding processing when the anionic water-soluble polymer remains in a resulting particulate polymer. For this reason, the initial suspension stabilizer to be used is preferably selected from a nonionic water-soluble polymer and poorly water-soluble inorganic microparticles. However, the use of poorly water-soluble inorganic microparticles is likely to lead to deterioration in transparency during molding processing when the poorly water-soluble inorganic microparticles remain in a resulting particulate polymer. For this reason, a nonionic water-soluble polymer is more preferably used as the initial suspension stabilizer. Particularly, a polyoxyethylene-polyoxypropylene block copolymer is most preferred in that yellowing is much less likely to occur during molding processing. The polyoxyethylene-polyoxypropylene block copolymer itself has excellent heat stability during molding processing and is less likely to turn yellow, and in addition, can exert an excellent dispersing effect because its polyoxypropylene (PPO) chains having high hydrophobicity adsorb to the hydrophobic surface of monomer oil droplets or polymer particles and its hydrophilic polyoxyethylene (PEO) chains are hydrated and widely spread in an aqueous phase. As a result, the amount of the suspension stabilizer used can be significantly reduced, and therefore deterioration in transparency or yellowing is less likely to occur during molding processing, and in addition, there is a cost advantage.

The later suspension stabilizer is added when the polymerization conversion ratio of the monomer reaches 20 to 90%, preferably 20 to 75%, that is, when the polymer ratio of monomer oil droplets has increased with the progress of polymerization and coalescence and dispersion of the individual monomer oil droplets have become stabilized to some extent, and is therefore less likely to remain in a resulting particulate polymer. Therefore, the particulate polymer can have high purity and is less likely to deteriorate in transparency or turn yellow during molding processing. If the later suspension stabilizer is added when the polymerization conversion ratio is less than 20%, the suspension stabilizer is introduced into and remains in a resulting particulate polymer, that is, only a low-purity particulate polymer is obtained, and a fine powder is likely to be produced. If a fine powder is produced, the obtained particulate polymer has poor handleability during its collection, and a product powder obtained therefrom has poor handleability and involves the risk of dust explosion. On the other hand, if the later suspension stabilizer is added when the polymerization conversion ratio exceeds 90%, the polymerization system becomes unstable, and therefore coalescence of polymer particles occurs or only a low-purity particulate polymer is obtained. The amount of the later suspension stabilizer used is in the range of 0.005 to 2.0 parts by weight, preferably in the range of 0.005 to 1.0 parts by weight, more preferably in the range of 0.005 to 0.2 parts by weight relative to 100 parts by weight of the monomer, but is preferably smaller as long as the polymerization system is stable. If the amount of the later suspension stabilizer used is less than 0.005 parts by weight, the polymerization system becomes unstable. On the other hand, if the amount of the later suspension stabilizer used exceeds 2.0 parts by weight, a microparticulate polymer is produced or the amount of the suspension stabilizer remaining in or on the surface of a resulting particulate polymer is increased. Therefore, a reduction in the purity of a resulting particulate polymer or deterioration in optical characteristics during molding processing occurs, and the obtained particulate polymer has poor handleability during its collection and a product powder obtained therefrom has poor handleability and involves the risk of dust explosion. The later suspension stabilizer is selected from a polymer-type suspension stabilizer such as an anionic water-soluble polymer or a nonionic water-soluble polymer and an inorganic microparticle-type suspension stabilizer. These suspension stabilizers may be used singly or in combination of two or more of them. However, for the same reason as the above-described initial suspension stabilizer, the later suspension stabilizer is preferably a nonionic water-soluble polymer or an inorganic microparticle-type suspension stabilizer, more preferably a nonionic water-soluble polymer. As the nonionic water-soluble polymer, a polyoxyethylene-polyoxypropylene block copolymer is most preferred. The later suspension stabilizer may be added all at once, in portions, or continuously.

A suspension aid may be used in combination with the suspension stabilizer. The term "suspension aid" as used herein refers to a material known also as a dispersion aid, and examples thereof include: low-molecular surfactants such as anionic surfactants (e.g., sodium dodecylbenzenesulfonate, sodium lauryl sulfonate, sodium alkylnaphthalenesulfonate, and sodium dialkylsulfosuccinate); boric acid; and water-soluble inorganic salts such as sodium carbonate, disodium hydrogen phosphate, sodium dihydrogen phosphate, and sodium sulfate. As the suspension aid, disodium hydrogen phosphate is preferred. The suspension aid is less likely to cause a problem such as deterioration in transparency or yellowing during molding processing, and therefore may be present in the polymerization system from the start of polymerization.

For example, when inorganic microparticles are used as the suspension stabilizer, the use of a low-molecular surfactant as the suspension aid allows the surface of the inorganic microparticles to amphiphically behave at the interface between a monomer and water, and therefore the stabilizing effect of the suspension stabilizer is enhanced. Further, when a water-soluble polymer such as polyvinyl alcohol is used as the suspension stabilizer, the use of boric acid or an inorganic salt such as disodium hydrogen phosphate as the suspension aid allows the cross-linking reaction between the hydroxyl groups of polyvinyl alcohol to proceed, and therefore the ability of the suspension stabilizer to protect monomer oil droplets can be enhanced. Similarly, when a nonionic water-soluble polymer is used as the suspension stabilizer, the cross-linking reaction between ether bonds proceeds, and therefore the protection ability of the suspension stabilizer can be enhanced. The use of such a suspension aid in combination with the suspension stabilizer is preferred in that the polymerization system can be further stabilized. Particularly, the suspension aid is preferably a water-soluble inorganic salt from the viewpoint of suppressing yellowing during molding processing. It is to be noted that the term "suspension aid" as used in the present invention refers to one whose solubility in water at 25° C. is 2 wt % or higher. In this respect, the suspension aid is clearly distinguished from the suspension stabilizer composed of poorly water-soluble inorganic microparticles.

A polymerization initiator used for suspension polymerization in the present invention may be a well-known one for use in vinyl monomer polymerization. Examples of such a polymerization initiator include: azo compounds such as 2,2'-azobis(2,4-dimethylvaleronitrile), azobisisobutyronitrile, dimethyl 2,2'-azobisisobutyrate, 2,2'-azobis(2-methylbutyronitrile), and dimethyl 2,2'-azobis(2-methylpropionate); peroxyesters such as tertiary butyl peroxypivalate, tertiary butyl peroxy 2-ethylhexanoate, and cumyl peroxy 2-ethylhexanoate; and organic peroxides such as di-8,5,5,-trimethylhexanoyl peroxide, dilauroyl peroxide, and benzoyl peroxide. These polymerization initiators may be used singly or in combination of two or more of them. The amount of the polymerization initiator used is 0.02 to 2 wt % of the weight of a monomer or a monomer mixture.

A well-known chain transfer agent may be used in order to adjust the molecular weight of the polymer. Examples of the chain transfer agent include: alkyl mercaptans; alkyl sulfides; alkyl disulfides; thioglycolates such as 2-ethylhexyl thioglycolate; α-methylstyrene dimer; mercapto acids such as β-mercaptopropionic acid; and aromatic mercaptans such as benzyl mercaptan, thiophenol, thiocresol, and thionaphthol.

The molecular weight of the polymer is not particularly limited, and may be adjusted to a value suitable for intended use. Particularly, the polymer preferably has a weight-average molecular weight of 200,000 or higher when used in paint, inks, coating materials, adhesives, and the like from the viewpoint of toughness, coating strength, adhesive strength, surface hardness, abrasion resistance (resistance to scratching), tensile elongation (secondary formability), chemical resistance, and tack-free properties of coated surface before curing, or when used as an adhesive from the viewpoint of achieving a high initial adhesive strength and improving anti-sagging properties to improve workability.

A method for adding the polymerization initiator and the chain transfer agent is not particularly limited, but is most preferably a method in which both the polymerization initiator and the chain transfer agent are dissolved in a monomer(s) and the monomer(s) is(are) suspended in water and directly subjected to a polymerization reaction.

Further, a component usually added during molding processing of a hard plastic, such as a plasticizer, a lubricant, a stabilizer or a UV absorber, may be added to a monomer(s) during suspension polymerization, or may be blended with a particulate polymer obtained by suspension polymerization during molding processing.

The ratio between an aqueous medium and a monomer or a monomer mixture is in the range of 1:1 to 10:1, preferably in the range of 1:1 to 4:1. If the amount of the aqueous medium is too small, the monomer(s) is(are) likely to be non-uniformly dispersed so that the polymerization system becomes unstable. On the other hand, if the amount of the aqueous medium is too large, there is a disadvantage for production efficiency.

The suspension polymer particles can be produced by any well-known method such as a method in which a monomer or a monomer mixture is suspended in water and directly subjected to a polymerization reaction or a method in which part of a monomer or of a monomer mixture is suspended in water to initiate a polymerization reaction and then the rest of the monomer or the monomer mixture or a water suspension of the rest of the monomer or the monomer mixture is added in one step or in several steps or continuously to a polymerization reactor during the progress of the polymerization reaction to continue the polymerization reaction.

The temperature condition of the polymerization is about 60 to 120° C., and may be selected to be suitable for the polymerization initiator used. The time required for the polymerization varies depending on the type of polymerization initiator used, the amount of the polymerization initiator used, or the polymerization temperature, but is usually 1 to 24 hours.

The conditions of stirring may be the same as those employed for producing a (meth)acrylic resin by normal suspension polymerization. As an apparatus, a polymerization vessel is used, which is equipped with a stirrer having a well-known impeller such as a turbine blade, a Pfaudler blade, a propeller blade, a blue margin blade, or an H-shaped blade, and the vessel is usually equipped with a baffle.

After the completion of the suspension polymerization, washing, dehydration, and drying are performed by well-known methods to obtain a particulate polymer.

It is to be noted that when a nonionic water-soluble polymer is used in the preset invention, the amount of the nonionic water-soluble polymer used at the start of polymerization is 0 to 350 ppm, and therefore the amount of the nonionic water-soluble polymer contained in a resulting methyl methacrylate polymer can be made to be 500 ppm or less. The nonionic water-soluble polymer content of the methyl methacrylate polymer is preferably 200 ppm or less, more preferably 100 ppm or less, most preferably 50 ppm or less.

The methyl methacrylate polymer obtained in the present invention may be directly used in the form of particles or may be molded into pellets by an extrusion machine and then subjected to extrusion molding, injection molding, or compression molding with heating to obtain a molded article having a shape suitable for its intended use. Further, the methyl methacrylate polymer may be mixed with any additive suitable for its intended use, such as an antioxidant, a coloring agent, a UV absorber, a color stabilizer, a plasticizer, a lubricant, or a filler.

EXAMPLES

Hereinbelow, the present invention will be described in more detail based on the following Examples and Comparative Examples, but these examples are merely illustrative and are not intended to limit the present invention.

A polymerization conversion ratio was calculated according to the following procedure.

First, part of an obtained slurry was sampled, precisely weighed, and dried in a hot-air drier at 120° C. for 1 hour, and then the weight thereof after drying was precisely measured as the weight of solid matter. Then, the ratio between the results of precise weighing before and after drying was determined as a solid component content of the slurry. Finally, a polymerization conversion ratio was calculated by the following mathematical formula 1 using the solid component content. It is to be noted that a chain transfer agent was regarded as a prepared monomer in the mathematical formula 1.

Polymerization conversion ratio(%)=[(total weight of prepared raw materials×solid component content−total weight of raw materials other than water and monomers)/weight of prepared monomers]×100 (mathematical formula 1)

A volume-average particle size was measured using Microtrac MT3000II (manufactured by NIKKISO Co., Ltd.).

A weight-average molecular weight (Mw) was calculated by a standard polystyrene conversion method using gel permeation chromatography (GPC). In the present invention, a high-speed GPC instrument (HLC-8220GPC manufactured by Tosoh Corporation), a column "TSK guardcolumn Super HZ-H" manufactured by Tosoh Corporation, and tetrahydrofuran as a GPC solvent were used.

A total light transmittance was measured using an integrating sphere-type light transmittance measurement instrument (NDH2000 manufactured by Nippon Denshoku Industries Co., Ltd.) complying with JIS K7361-1. As a measuring object, a flat-plate sample manufactured by injection molding to have a thickness of 3 mm was used.

Haze was measured using an integrating sphere-type light transmittance measurement instrument (NDH2000 manufactured by Nippon Denshoku Industries Co., Ltd.) complying with JIS K7136. As a measuring object, a flat-plate sample manufactured by injection molding to have a thickness of 3 mm was used.

Transparent yellowness index was measured using a colorimeter (ZE-2000 manufactured by Nippon Denshoku Industries Co., Ltd.) complying with JIS Z8722. As a measuring object, a flat-plate sample manufactured by injection molding to have a thickness of 3 mm was used.

Example 1

200 parts by weight of deionized water and 0.5 parts by weight of disodium hydrogen phosphate as a suspension aid were prepared and placed in a glass reactor having a capacity of 8 L and equipped with an H-shaped stirrer. Then, a monomer mixture obtained by dissolving, in 0.95 parts by weight of lauroyl peroxide, 97 parts by weight of methyl methacrylate, 3 parts by weight of methyl acrylate, and 0.15 parts by weight of 2-ethylhexyl thioglycolate was added to the reactor with stirring at 250 rpm, and the temperature in the reactor was increased to 60° C. while air in the reactor was purged with nitrogen to initiate polymerization. No initial suspension stabilizer was added. After a lapse of 70 minutes from the time when the temperature in the reactor reached 60° C., 0.06 parts by weight of a nonionic water-soluble polymer, Adeka Pluronic F-68 (polyoxyethylene-polyoxypropylene block copolymer manufactured by ADEKA Corporation) was added as a later suspension stabilizer. At this point, a polymerization conversion ratio was 27%. Then, the reaction was further continued at 60° C. for 85 minutes, and then the temperature in the reactor was increased to 80° C. and stirring was continued for 3 hours to terminate the polymerization. The thus obtained polymer was washed four times with deionized water in an amount of three times the amount of the resin, and was then dried to obtain bead-like suspension polymer particles. The obtained polymer had a volume-average particle size of 530 μm and a Mw of 245000.

Example 2

Example 2 was performed in the same manner as in Example 1 except that disodium hydrogen phosphate as a suspension aid was not used. It is to be noted that a polymerization conversion ratio at the time when Adeka Pluronic F-68 was added was 41%. The thus obtained polymer had a volume-average particle size of 500 μm and a Mw of 262000.

Example 3

In a glass reactor having a capacity of 8 L and equipped with an H-shaped stirrer, 200 parts by weight of deionized water and 0.5 parts by weight of disodium hydrogen phosphate as a suspension aid were prepared and placed. Then, a monomer mixture obtained by dissolving, in 0.95 parts by weight of lauroyl peroxide, 95 parts by weight of methyl methacrylate, 5 parts by weight of methyl acrylate, and 0.6 parts by weight of 2-ethylhexyl thioglycolate was added to the reactor with stirring at 250 rpm, and the temperature in the reactor was increased to 60° C. while air in the reactor was purged with nitrogen to initiate polymerization. No initial suspension stabilizer was added. After a lapse of 120 minutes from the time when the temperature in the reactor reached 60° C., 0.06 parts by weight of a nonionic water-soluble polymer, Adeka Pluronic F-68 (polyoxyethylene-polyoxypropylene block copolymer manufactured by ADEKA Corporation) was added as a later suspension stabilizer. At this point, a polymerization conversion ratio was 30%. Then, the reaction was further continued at 60° C. for 65 minutes, and then the temperature in the reactor was increased to 80° C. and stirring was continued for 3 hours to terminate the polymerization. The thus obtained polymer was washed four times with deionized water in an amount of three times the amount of the resin, and was then dried to obtain bead-like suspension polymer particles. The obtained polymer had a volume-average particle size of 500 µm and a Mw of 86000.

Example 4

In a glass reactor having a capacity of 8 L and equipped with an H-shaped stirrer, 200 parts by weight of deionized water and 0.5 parts by weight of disodium hydrogen phosphate as a suspension aid were prepared and placed. Then, a monomer mixture obtained by dissolving, in 0.95 parts by weight of lauroyl peroxide, 95 parts by weight of methyl methacrylate, 5 parts by weight of methyl acrylate, and 0.375 parts by weight of 2-ethylhexyl thioglycolate was added to the reactor with stirring at 250 rpm, and the temperature in the reactor was increased to 60° C. while air in the reactor was purged with nitrogen to initiate polymerization. No initial suspension stabilizer was added. After a lapse of 110 minutes from the time when the temperature in the reactor reached 60° C., 0.06 parts by weight of a nonionic water-soluble polymer, Adeka Pluronic F-68 (polyoxyethylene-polyoxypropylene block copolymer manufactured by ADEKA Corporation) was added as a later suspension stabilizer. At this point, a polymerization conversion ratio was 27%. Then, the reaction was further continued at 60° C. for 65 minutes, and then the temperature in the reactor was increased to 80° C. and stirring was continued for 3 hours to terminate the polymerization. The thus obtained polymer was washed four times with deionized water in an amount of three times the amount of the resin, and was then dried to obtain bead-like suspension polymer particles. The obtained polymer had a volume-average particle size of 450 µm and a Mw of 124000.

Example 5

In a glass reactor having a capacity of 8 L and equipped with an H-shaped stirrer, 200 parts by weight of deionized water and 0.5 parts by weight of disodium hydrogen phosphate as a suspension aid were prepared and placed. Then, a monomer mixture obtained by dissolving, in 0.95 parts by weight of lauroyl peroxide, 95 parts by weight of methyl methacrylate, 5 parts by weight of butyl acrylate, and 0.45 parts by weight of 2-ethylhexyl thioglycolate was added to the reactor with stirring at 250 rpm, and the temperature in the reactor was increased to 60° C. while air in the reactor was purged with nitrogen to initiate polymerization. No initial suspension stabilizer was added. After a lapse of 110 minutes from the time when the temperature in the reactor reached 60° C., 0.06 parts by weight of a nonionic water-soluble polymer, Adeka Pluronic F-68 (polyoxyethylene-polyoxypropylene block copolymer manufactured by ADEKA Corporation) was added as a later suspension stabilizer. At this point, a polymerization conversion ratio was 32%. Then, the reaction was further continued at 60° C. for 75 minutes, and then the temperature in the reactor was increased to 80° C. and stirring was continued for 3 hours to terminate the polymerization. The thus obtained polymer was washed four times with deionized water in an amount of three times the amount of the resin, and was then dried to obtain bead-like suspension polymer particles. The obtained polymer had a volume-average particle size of 550 µm and a Mw of 83000.

Comparative Example 1

Comparative Example 1 was performed in the same manner as in Example 1 except that polymerization was initiated after 0.04 parts by weight (400 ppm relative to the monomers) of sodium polymethacrylate (manufactured by Sigma-Aldrich Japan, Mw: 9500, Mn: 5400) was added as an initial suspension stabilizer. It is to be noted that a polymerization conversion ratio at the time when Adeka Pluronic F-68 was added was 35%. The thus obtained polymer had a volume-average particle size of 430 µm and a Mw of 241000.

Comparative Example 2

Comparative Example 2 was performed in the same manner as in Example 1 except that polymerization was initiated after 0.4 parts by weight (4000 ppm relative to the monomers) of tribasic calcium phosphate (TCP-10·U manufactured by Taihei Chemical Industrial Co., Ltd.) on a pure basis and 0.25 parts by weight (2500 ppm relative to the monomers) of polyvinyl alcohol (Gohsenol KH-17 manufactured by The Nippon Synthetic Chemical Industry Co., Ltd.) were added as an initial suspension stabilizer and that Adeka Pluronic F-68 was not added in the middle of the polymerization. The thus obtained polymer had a volume-average particle size of 200 µm and a Mw of 243000.

(Preparation of Molded Products and Physical Property Evaluation)

Using a vent-equipped single screw extruder (HW-40-28 manufactured by Tabata Industrial Machinery Co., Ltd., 40 m/m, L/D=28), 100 parts by weight of each of the polymers obtained in the above Examples and Comparative Examples was extrusion-kneaded under conditions of preset temperatures of C1 to C3=200° C., C4=210° C., C5=220° C., and D=230° C. to obtain pellets. The thus obtained pellets were dried at 90° C. for 3 hours or longer, and were then injection-molded using an injection molding machine (Model 160MSP-10 manufactured by Mitsubishi Plastics Inc.) under conditions of cylinder temperatures of T3=240° C., T2=245° C., and T1=250° C., a nozzle temperature of N=255° C., and a mold temperature of 60° C. to obtain flat-plate samples having a thickness of 3 mm. The thus obtained flat-plate samples were used to measure total light transmittance and haze as indexes of transparency and to measure transparent yellowness index as an index of the degree of yellowing due to thermal degradation. Results are shown in Table 1.

TABLE 1

| | Monomers (part by weight) | Suspension aid (part by weight) | Type of initial suspension stabilizer (ppm) | Type of later suspension stabilizer (part by weight) | Mw | Total light transmittance (%) | Haze (%) | Transparent YI |
|---|---|---|---|---|---|---|---|---|
| Example 1 | MMA/MA (97/3) | 0.5 | None | F-68(0.06) | 245000 | 92.3 | 0.6 | 0.8 |
| Example 2 | MMA/MA (97/3) | None | None | F-68(0.06) | 262000 | 92.3 | 0.6 | 0.8 |
| Example 3 | MMA/MA (95/5) | 0.5 | None | F-68(0.06) | 86000 | 92.3 | 0.6 | 0.8 |
| Example 4 | MMA/MA (95/5) | 0.5 | None | F-68(0.06) | 124000 | 92.3 | 0.6 | 0.8 |
| Example 5 | MMA/BA (95/5) | 0.5 | None | F-68(0.06) | 83000 | 92.2 | 0.6 | 0.8 |
| Comparative Example 1 | MMA/MA (97/3) | 0.5 | PMMA-Na (400) | F-68(0.06) | 241000 | 91.8 | 0.8 | 1.9 |
| Comparative Example 2 | MMA/MA (97/3) | 0.5 | TCP-10 · U(4000) KH-17(2500) | None | 243000 | 83.6 | 76.2 | 39.0 |

MMA: methyl methacrylate
MA: methyl acrylate
BA: butyl acrylate
PMMA-Na: sodium polymethacrylate

The invention claimed is:

1. A method for producing a methyl methacrylate polymer, comprising suspension polymerization of 30 to 100 wt % of methyl methacrylate and 70 to 0 wt % of a monomer copolymerizable therewith to produce a methyl methacrylate polymer, wherein the polymerization is initiated in the presence of 200 ppm or less of an initial suspension stabilizer relative to the monomer(s), and then a later suspension stabilizer is added when a polymerization conversion ratio reaches 20 to 90% and wherein the initial suspension stabilizer is a nonionic water-soluble polymer and/or poorly water-soluble inorganic microparticles.

2. The method for producing a methyl methacrylate polymer according to claim 1, wherein the initial suspension stabilizer is a nonionic water-soluble polymer.

3. The method for producing a methyl methacrylate polymer according to claim 1, wherein the polymerization is initiated without using the initial suspension stabilizer.

4. The method for producing a methyl methacrylate polymer according to claim 1, wherein the nonionic water-soluble polymer is a polyoxyethylene-polyoxypropylene block copolymer.

5. The method for producing a methyl methacrylate polymer according to claim 1, wherein the polymerization is initiated in the presence of a suspension aid.

6. The method for producing a methyl methacrylate polymer according to claim 1, wherein the methyl methacrylate polymer has a weight-average molecular weight of 200,000 or higher.

7. The method for producing a methyl methacrylate polymer according to claim 1, wherein the later suspension stabilizer is a nonionic water-soluble polymer.

* * * * *